(12) United States Patent
Chachad et al.

(10) Patent No.: US 11,609,818 B2
(45) Date of Patent: Mar. 21, 2023

(54) PIPELINED READ-MODIFY-WRITE OPERATIONS IN CACHE MEMORY

(71) Applicant: Texas Instruments Incorporated, Dallas, TX (US)

(72) Inventors: Abhijeet Ashok Chachad, Plano, TX (US); David Matthew Thompson, Dallas, TX (US); Daniel Brad Wu, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 17/588,448

(22) Filed: Jan. 31, 2022

(65) Prior Publication Data
US 2022/0156149 A1    May 19, 2022

Related U.S. Application Data

(63) Continuation of application No. 16/874,435, filed on May 14, 2020, now Pat. No. 11,237,905.
(Continued)

(51) Int. Cl.
*G06F 11/10* (2006.01)
*G06F 3/06* (2006.01)
(Continued)

(52) U.S. Cl.
CPC .......... *G06F 11/1076* (2013.01); *G06F 3/064* (2013.01); *G06F 3/0619* (2013.01);
(Continued)

(58) Field of Classification Search
CPC .... G06F 11/1076; G06F 3/0619; G06F 3/064; G06F 3/0659; G06F 3/0673;
(Continued)

(56) References Cited

U.S. PATENT DOCUMENTS 5,517,626 A     5/1996   Archer et al.
5,996,105 A    11/1999   Zook
(Continued)

OTHER PUBLICATIONS

International Search Report for PCT/US2020/034571 dated Aug. 13, 202.

*Primary Examiner* — Kyle Vallecillo
(74) *Attorney, Agent, or Firm* — Brian D. Graham; Frank D. Cimino

(57) ABSTRACT

In described examples, a processor system includes a processor core that generates memory write requests, a cache memory, and a memory pipeline of the cache memory. The memory pipeline has a holding buffer, an anchor stage, and an RMW pipeline. The anchor stage determines whether a data payload of a write request corresponds to a partial write. If so, the data payload is written to the holding buffer and conforming data is read from a corresponding cache memory address to merge with the data payload. The RMW pipeline has a merge stage and a syndrome generation stage. The merge stage merges the data payload in the holding buffer with the conforming data to make merged data. The syndrome generation stage generates an ECC syndrome using the merged data. The memory pipeline writes the data payload and ECC syndrome to the cache memory.

17 Claims, 6 Drawing Sheets

Related U.S. Application Data

(60) Provisional application No. 62/852,420, filed on May 24, 2019.

(51) Int. Cl.
*G06F 12/0811* (2016.01)
*G06F 9/38* (2018.01)
*G06F 12/0815* (2016.01)
*G06F 12/126* (2016.01)

(52) U.S. Cl.
CPC .......... *G06F 3/0659* (2013.01); *G06F 3/0673* (2013.01); *G06F 3/0685* (2013.01); *G06F 9/3816* (2013.01); *G06F 12/0811* (2013.01); *G06F 12/0815* (2013.01); *G06F 12/126* (2013.01); *G06F 3/0604* (2013.01); *G06F 2212/608* (2013.01)

(58) Field of Classification Search
CPC .. G06F 3/0685; G06F 9/3816; G06F 12/0811; G06F 12/0815; G06F 12/126; G06F 3/0604; G06F 2212/608
See application file for complete search history.

(56) References Cited

U.S. PATENT DOCUMENTS

| | | |
|---|---|---|
| 6,961,057 B1 | 11/2005 | Van Dyke et al. |
| 7,565,593 B2 | 7/2009 | Dixon et al. |
| 2008/0140909 A1 | 6/2008 | Flynn et al. |
| 2009/0276587 A1* | 11/2009 | Moyer ................ G06F 11/1044 711/155 |
| 2009/0307523 A1 | 12/2009 | Allison et al. |
| 2011/0258391 A1* | 10/2011 | Atkisson ............... G06F 11/108 711/E12.017 |
| 2012/0124294 A1 | 5/2012 | Atkisson et al. |
| 2012/0198174 A1 | 8/2012 | Nellans et al. |
| 2012/0210041 A1 | 8/2012 | Flynn et al. |
| 2012/0221774 A1 | 8/2012 | Atkisson et al. |
| 2013/0185475 A1 | 7/2013 | Talagala et al. |
| 2013/0185488 A1 | 7/2013 | Talagala et al. |
| 2013/0191601 A1 | 7/2013 | Peterson et al. |
| 2013/0290654 A1* | 10/2013 | Sato ....................... G06F 12/04 711/155 |
| 2013/0304990 A1 | 11/2013 | Bass et al. |
| 2014/0095775 A1 | 4/2014 | Talagala et al. |

\* cited by examiner

| CASE | BYTES IN DATA PAYLOAD TO BE WRITTEN IN MEMORY LINE AT TARGET ADDRESS ||||
|---|---|---|---|---|
| | [127:96] | [95:64] | [63:32] | [31:0] |
| 1 | PARTIAL | PARTIAL | PARTIAL | PARTIAL |
| 2 | PARTIAL | PARTIAL | PARTIAL | ALL BYTES |
| 3 | PARTIAL | PARTIAL | ALL BYTES | PARTIAL |
| 4 | PARTIAL | ALL BYTES | PARTIAL | ALL BYTES |
| 5 | PARTIAL | ALL BYTES | ALL BYTES | PARTIAL |
| 6 | PARTIAL | ALL BYTES | PARTIAL | ALL BYTES |
| 7 | PARTIAL | PARTIAL | ALL BYTES | PARTIAL |
| 8 | PARTIAL | PARTIAL | ALL BYTES | ALL BYTES |
| 9 | ALL BYTES | PARTIAL | PARTIAL | PARTIAL |
| 10 | ALL BYTES | PARTIAL | PARTIAL | ALL BYTES |
| 11 | ALL BYTES | PARTIAL | ALL BYTES | PARTIAL |
| 12 | ALL BYTES | PARTIAL | PARTIAL | ALL BYTES |
| 13 | ALL BYTES | ALL BYTES | ALL BYTES | PARTIAL |
| 14 | ALL BYTES | ALL BYTES | PARTIAL | PARTIAL |
| 15 | ALL BYTES | ALL BYTES | ALL BYTES | PARTIAL |
| 16 | ALL BYTES | ALL BYTES | ALL BYTES | ALL BYTES |

FIG. 4A

| CASE | PHYSICAL BANK 1, VIRTUAL BANK 1 | PHYSICAL BANK 1, VIRTUAL BANK 0 | PHYSICAL BANK 0, VIRTUAL BANK 1 | PHYSICAL BANK 0, VIRTUAL BANK 0 |
|---|---|---|---|---|
| 1 | RMW | RMW | RMW | RMW |
| 2 | RMW | RMW | RMW | WRITE |
| 3 | RMW | RMW | WRITE | RMW |
| 4 | RMW | WRITE | RMW | WRITE |
| 5 | RMW | RMW | RMW | RMW |
| 6 | RMW | WRITE | WRITE | WRITE |
| 7 | WRITE | RMW | RMW | RMW |
| 8 | WRITE | RMW | WRITE | RMW |
| 9 | WRITE | RMW | RMW | RMW |
| 10 | WRITE | WRITE | RMW | WRITE |
| 11 | WRITE | WRITE | WRITE | RMW |
| 12 | WRITE | WRITE | RMW | WRITE |
| 13 | WRITE | WRITE | WRITE | RMW |
| 14 | WRITE | WRITE | WRITE | WRITE |
| 15 | WRITE | WRITE | WRITE | RMW |
| 16 | WRITE | WRITE | WRITE | ALL WRITE |

FIG. 4C

PIPELINED READ-MODIFY-WRITE OPERATIONS IN CACHE MEMORY

CROSS-REFERENCE TO RELATED APPLICATION

This application is a continuation of U.S. patent application Ser. No. 16/874,435, filed May 14, 2020, which claims the benefit of and priority to U.S. Provisional Patent Application No. 62/852,420, filed May 24, 2019, each of which is hereby fully incorporated herein by reference.

TECHNICAL FIELD

The present disclosure relates generally to a processing device that can be formed as part of an integrated circuit, such as a system on a chip (SoC). More specifically, this disclosure relates to improvements in management of read-modify-write operations in a memory system of such a processing device.

BACKGROUND

An SOC is an integrated circuit with multiple functional blocks on a single die, such as one or more processor cores, memory, and input and output.

Memory write requests are generated by ongoing system processes by a processor connected to the bus fabric, such as a central processing unit (CPU) or a digital signal processor (DSP), and are directed towards a particular system memory, such as a cache memory or a main memory. Memory can be, for example, a static random-access memory (SRAM). Memory write requests include a data payload to be written, and may include a code used to correct errors in the data payload (the data payload can be considered to include the ECC syndrome). This code is referred to herein as an error correction code (ECC) syndrome. The amount of data corresponding to an ECC syndrome, which can be corrected using the ECC syndrome, is referred to herein as a chunk. A chunk can be, for example, a single word, such as a 32 byte word, or another data length.

Hierarchical memory moves data and instructions between memory blocks with different read/write response times for respective processor cores (such as a CPU or a DSP). For example, memories which are more local to respective processor cores will typically have lower response times. Hierarchical memories include cache memory systems with multiple levels (such as L1, L2, and L3), in which different levels describe different degrees of locality or different average response times of the cache memories to respective processor cores. Herein, the more local or lower response time cache memory (such as an L1 cache) is referred to as being a higher level cache memory than a less local or higher response time lower level cache memory (such as an L2 cache or L3 cache).

SUMMARY

In described examples, a processor system includes a processor core that generates memory write requests, a cache memory, and a memory pipeline of the cache memory. The memory pipeline has a holding buffer, an anchor stage, and a Read-Modify-Write (RMW) pipeline. The anchor stage determines whether a data payload of a write request corresponds to a partial write. If so, the data payload is written to the holding buffer and conforming data is read from a corresponding cache memory address to merge with the data payload. The RMW pipeline has a merge stage and a syndrome generation stage. The merge stage merges the data payload in the holding buffer with the conforming data to make merged data. The syndrome generation stage generates an ECC syndrome using the merged data. The memory pipeline writes the data payload and ECC syndrome to the cache memory.

BRIEF DESCRIPTION OF THE DRAWINGS

FIG. 4A shows a table providing an example list of different combinations of chunk contents in a data payload of a write request that targets a write at an address in a cache memory.

FIG. 4C shows a table providing an alternative example list of whether an RMW is utilized for corresponding cases of FIG. 4A.

DETAILED DESCRIPTION

Figure 1:
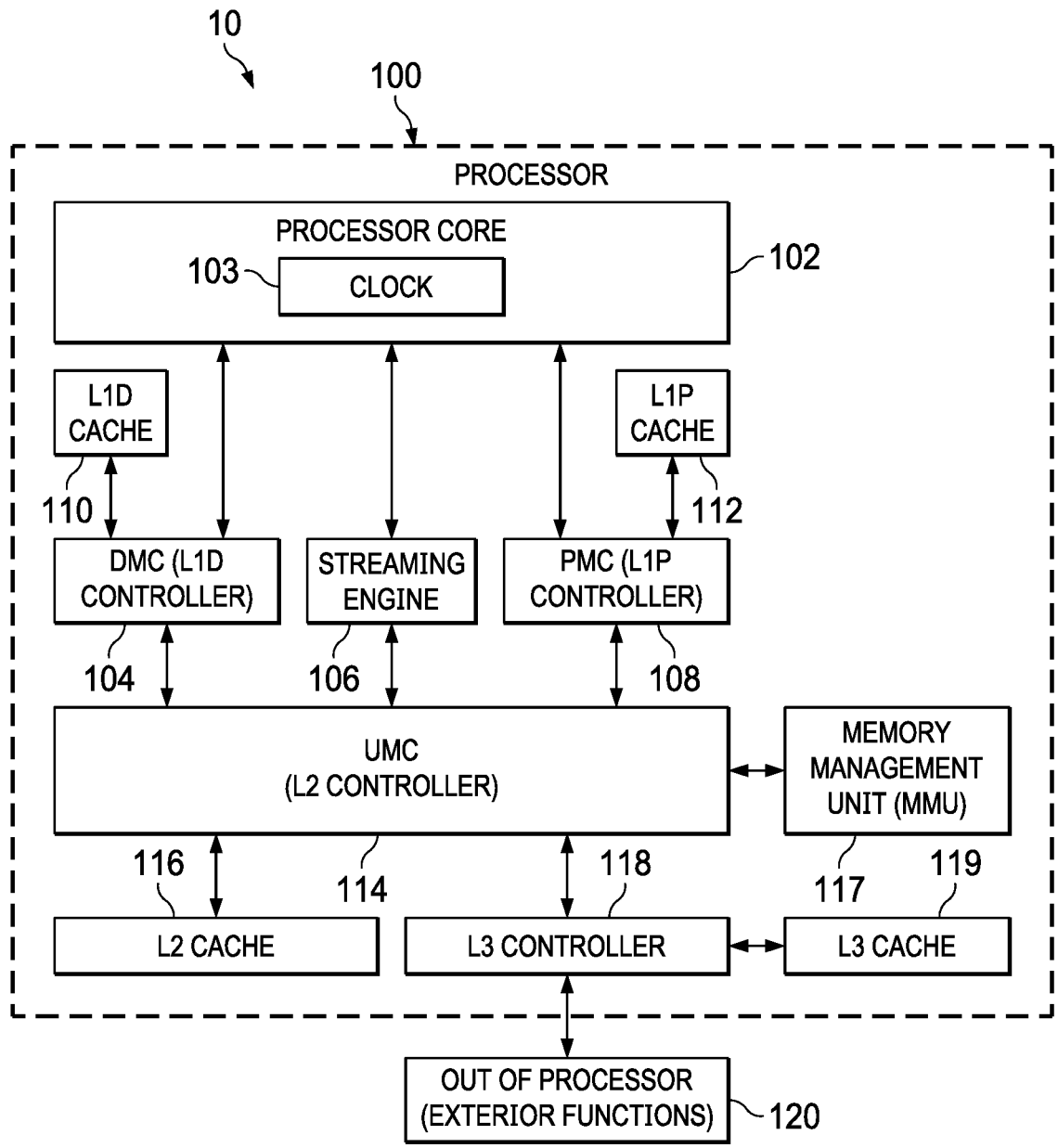
FIG. 1 is a block diagram of an example processor that is a portion of a system on a chip (SoC).

FIG. 1 is a block diagram of an example processor 100 that is a portion of an SoC 10. SoC 10 includes a processor core 102, such as a CPU or DSP, that generates new data. Processor 100 can include a clock 103, which can be part of processor core 102 or separate therefrom (separate clock not shown). Processor core 102 also generates memory read requests that request reads from, as well as memory write requests that request writes to, a data memory controller 104 (DMC) and a streaming engine 106. In some embodiments, processor core 102 generates one read request or write request per cycle of clock 103 of processor core 102. Processor core 102 is also coupled to receive instructions from a program memory controller 108 (PMC), which retrieves those instructions from program memory, such as an L1P cache 112. Streaming engine 106 facilitates processor core 102 by sending certain memory transactions and other memory-related messages that bypass DMC 104 and PMC 108.

SoC 10 has a hierarchical memory system. Each cache at each level may be unified or divided into separate data and program caches. For example, the DMC 104 may be coupled to a level 1 data cache 110 (L1D cache) to control data writes to and data reads from the L1D cache 110. Similarly, the PMC 108 may be coupled to a level 1 program cache 112 (L1P cache) to read instructions for execution by processor core 102 from the L1P cache 112. (In this example, processor core 102 does not generate writes to L1P cache 112.) A unified memory controller 114 (UMC) for a level 2 cache (L2 cache 116, such as L2 SRAM) is communicatively coupled to receive read and write memory access requests from DMC 104 and PMC 108, and to receive read requests from streaming engine 106, PMC 108, and a memory management unit 117 (MMU). UMC 114 is communicatively coupled to pass read data (from beyond level 1 caching) to DMC 104, streaming engine 106, and PMC 108, which is then passed on to processor core 102. UMC 114 is also coupled to control writes to, and reads from, L2 cache 116, and to pass memory access requests to a level 3 cache controller 118 (L3 controller). L3 controller 118 is coupled to control writes to, and reads from, L3 cache 119. UMC 114 is coupled to receive data read from L2 cache 116 and L3 cache 119 (via L3 controller 118). UMC 114 is configured to control pipelining of memory transactions (read and write requests) for instructions and data. L3 controller 118 is coupled to control writes to, and reads from, L3 cache 119, and to mediate transactions with exterior functions 120 that are exterior to processor 100, such as other processor cores, peripheral functions of the SOC 10, and/or other SoCs. That is, L3 controller 118 is a shared memory controller of the SoC 10, and L3 cache 119 is a shared cache memory of the SoC 10. Accordingly, memory transactions relating to processor 100 and exterior functions 120 pass through L3 controller 118. Memory transactions are generated by processor core 102 and are communicated towards lower level cache memory, or are generated by exterior functions 120 and communicated towards higher level cache memory.

MMU 117 provides address translation and memory attribute information to the processor core 102. It does this by looking up information in tables that are stored in memory (connection between MMU 117 and UMC 114 enables MMU 117 to use read requests to access memory containing the tables).

Figure 2:
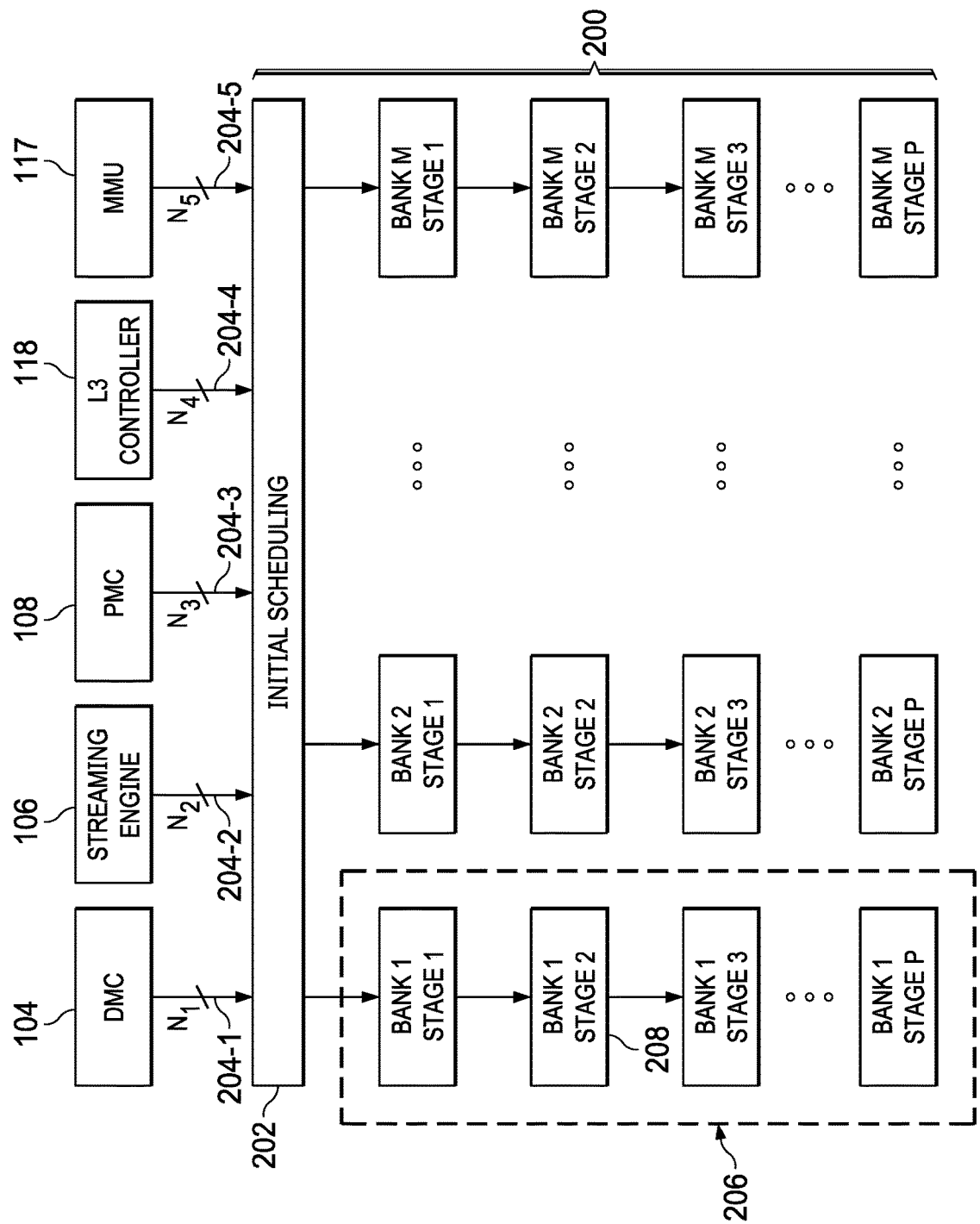
FIG. 2 is a block diagram of an example memory pipeline included within or associated with a memory controller of FIG. 1.

FIG. 2 is a block diagram including an example memory pipeline 200 for receiving and servicing memory transaction requests and included within or associated with the FIG. 1 UMC 114, so for illustration FIG. 2 also repeats various blocks from FIG. 1 that communicate with UMC 114. Memory pipeline 200 includes an initial scheduling block 202 coupled to an integer number M of pipeline banks 206. Each pipeline bank 206 includes an integer number P of stages 208 and is illustrated as a vertical column below initial scheduling block 202. Different ones of the stages 208 can perform different functions, such as (without limitation) translation between a CPU address and a cache address, cache hit detection, checking for errors such as addressing or out-of-range errors, and writing to the corresponding cache memory.

DMC 104 is coupled to initial scheduling block 202 by a bus 204-1 that is a number $N_1$ lines wide, enabling DMC 104 to make a read or write request transferring a number $N_1$ bits of data at a time. Streaming engine 106 is coupled to initial scheduling block 202 by a bus 204-2 that is a number $N_2$ lines wide, enabling streaming engine 106 to make a read request transferring a number $N_2$ bits of data at a time. PMC 108 is coupled to initial scheduling block 202 by a bus 204-3 that is a number $N_3$ lines wide, enabling PMC 108 to make a read request transferring a number $N_3$ bits of data at a time. L3 controller 118 is coupled to initial scheduling block 202 by a bus 204-4 that is a number $N_4$ lines wide, enabling L3 118 to make a read or write request transferring a number $N_4$ bits of data at a time. MMU 117 is coupled to initial scheduling block 202 by a bus 204-5 that is a number $N_5$ lines wide, enabling MMU 117 to make a read request transferring a number $N_5$ bits of data at a time.

When a memory controller of processor 100 (such as DMC 104, streaming engine 106, PMC 108, or L3 controller 118) communicates to UMC 114 a request for a read from, or a write to, a memory intermediated by UMC 114 (such as L2 cache 116, L3 cache 119, or a memory in exterior functions 120), initial scheduling block 202 schedules the request to be handled by an appropriate pipeline bank 206 for the particular request. Accordingly, initial scheduling block 202 performs arbitration on read and write requests. Arbitration determines which pipeline bank 206 will receive which of the memory transactions queued at initial scheduling block 202, and in what order. Typically, a read or write request can only be scheduled into a corresponding one of pipeline banks 206, depending on, for example, the memory address of the data being written or requested, request load of pipeline banks 206, or a pseudo-random function. Initial scheduling block 202 schedules read and write requests received from DMC 104, streaming engine 106, PMC 108, and L3 controller 118, by selecting among the first stages of pipeline banks 206. Memory transactions requested to be performed on L3 cache 119 (or exterior functions 120) are arbitrated and scheduled into an L3 cache pipeline by an L3 cache scheduling block (not shown) in L3 controller 118 after passing through memory pipeline 200 corresponding to L2 cache 116 (pipeline banks 206, and potentially bus snooping-related stages, which are not shown).

Request scheduling prevents conflicts between read or write requests that are to be handled by the same pipeline bank 206, and preserves memory coherence (further discussed below). For example, request scheduling maintains order among memory transactions that are placed into a memory transaction queue (memory access request queue) of initial scheduling block 202 by different memory controllers of processor 100, or by different bus lines of a same memory controller.

Further, a pipeline memory transaction (a read or write request) sent by DMC 104 or PMC 108 is requested because the memory transaction has already passed through a corresponding level 1 cache pipeline (in DMC 104 for L1D cache 110, and in PMC 108 for L1P cache 112), and is either targeted to a lower level cache (or exterior functions 120) or has produced a miss in the respective level 1 cache. Accordingly, memory transactions that produce level 1 cache hits generally do not require access to pipeline banks 206 shown in FIG. 2, which control or intermediate memory access to L2 cache 116, L3 cache 119, and exterior functions 120 (see FIG. 1).

Pipeline banks 206 shown in FIG. 2 are part of UMC 114. L1D cache 110 can hold data generated by processor core 102. L2 cache 116 or L3 cache 119 can make data generated by processor core 102 available to exterior functions 120 by, for example, data being written to L2 cache 116 or L3 cache 119, or via snoop transactions from L2 cache controller 114 or L3 cache controller 118.

Memory coherence is when memory contents at logically the same address (or at least contents deemed or indicated as valid) throughout the memory system are the same contents expected by the one or more processors in the system based on an ordered stream of read and write requests. Writes affecting a particular data, or at a particular logical memory address, are prevented from bypassing earlier-issued writes or reads affecting the same data or the same memory address. Also, certain types of transactions take priority, such as victim cache transactions (no victim cache is shown) and snoop transactions.

A victim cache is a fully associative cache associated with a particular cache memory and may be configured so that if there is a cache hit, no action is taken with respect to the corresponding victim cache; if there is a cache miss and a victim cache hit, the corresponding memory lines are swapped between the cache and the victim cache; and if there is a cache miss and victim cache miss, data corresponding to the location in main memory producing the cache miss is written in a corresponding cache line, and the previous contents of the cache line are written in the victim cache. Fully associative means that data corresponding to any location in main memory can be written into any line of the victim cache.

Bus snooping is a scheme by which a coherence controller (snooper) in a cache monitors or snoops bus transactions to maintain memory coherence in distributed shared memory systems (such as in SoC 10). If a transaction modifying a shared cache block appears on a bus, the snoopers check whether their respective caches have a copy of data corresponding to the same logical address of the shared block. If a cache has a copy of the shared block, the corresponding snooper performs an action to ensure memory coherence in the cache. This action can be, for example, flushing, invalidating, or updating the shared block, according to the transaction detected on the bus.

At the first level of arbitration performed by initial scheduling block 202, UMC 114 (the L2 cache 116 controller, which includes initial scheduling block 202) determines whether to allow a memory transaction to proceed in memory pipeline 200, and in which pipeline bank 206 to proceed. Generally, each pipeline bank 206 is independent, such that read and write transactions on each pipeline bank 206 (for example, writes of data from L1D cache 110 to L2 cache 116) does not have ordering or coherency requirements with respect to write transactions on other pipeline banks 206. Within each pipeline bank, writes to L2 cache 116 proceed in the order they are scheduled. If a memory transaction causes an addressing hazard or violates an ordering requirement, the transaction stalls and is not issued to a pipeline bank 206.

A partial write request (also referred to herein as a partial write) is a write request with a data payload that includes a chunk (or more than one chunk) in which one or more, but less than all, bytes in the chunk will be written to the destination memory address. For example, in some systems, a write request data payload can be shorter than a destination memory's addressable location write length, but still equal to or larger than the location's minimum write length. Minimum write length refers to the amount of data that can be read from or written to a memory in a single clock cycle, which is generally determined by the physical width of the memory. Generally, a memory's minimum write length will be a multiple of the chunk length. For example, a memory with a 128 byte line length may have a 64 byte minimum write length, corresponding to writing to a first physical bank of a line of the memory (bytes 0 to 63 of the line) or a second physical bank of the memory line (bytes 64 to 127 of the line). An example partial write request can be to write a data payload from bytes 0 to 110 of the line, meaning that in one of the chunks of the data payload (the chunk corresponding to bytes 96 to 127 of the line), only 15 out of 32 bytes will be written (corresponding to bytes 96 to 110 of the line). Also, in some systems, a write request data payload can be sparse (sparse is a special case of partial write). A sparse data payload is configured to write a non-continuous set of bytes within a destination memory. For example, a data payload may be targeted to write to bytes 0 through 24 and 42 through 63 (or only the even-numbered bytes, or bytes 1, 15, and 27, or some other arbitrary arrangement) of a destination memory addressable location. If a write request data payload is configured to fill complete chunks in a complete destination memory addressable location, such as bytes 0 to 63 in the example above (or the full line corresponding to bytes 0 to 127), the write request will generally not be considered a partial write.

Partial writes trigger read-modify-write (RMW) operations. In an RMW operation, data is read from the destination cache memory in a read portion of the operation and used to supply those values not specified by the RMW operation and that are not to be changed by the operation. In this way, the data from the read portion conforms the data payload of the write portion of the operation to be continuous and full (not a partial write) to the destination cache memory's minimum write length. After this, an updated error correction code (ECC) is generated from and appended to the resulting conformed data payload to preserve data integrity of the unwritten data. The data payload in written to the destination cache memory with the updated ECC, with or without the conforming data. For example, in the example above in which the data payload includes bytes 0 through 24 and 42 through 63 (chunks corresponding to bytes 0 through 31 and 32 through 63 correspond to partial write), bytes 25 through 41 are read to conform the data payload to the 64 byte minimum write length.

Figure 3:
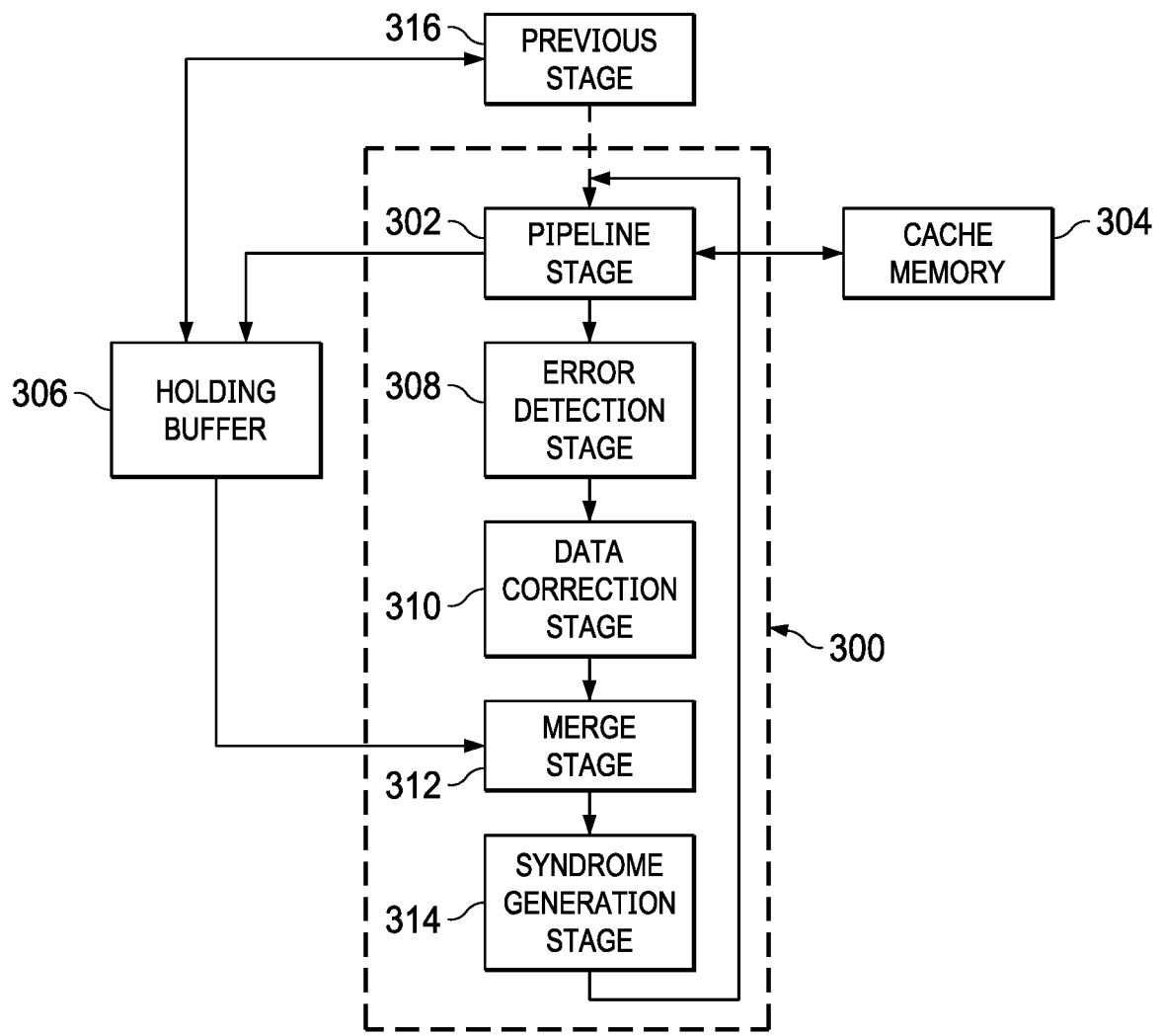
FIG. 3 is a block diagram of an example RMW memory pipeline, as part of a processor, for processing RMW memory transactions.

FIG. 3 is a block diagram of an example RMW memory sub-pipeline 300, as part of processor 100, for processing RMW memory transactions. RMW memory sub-pipeline 300 conditionally processes a memory read request as part of a cache memory pipeline, such as part of a selected stage (for example, a stage selected from Stage 1 through Stage P) of memory pipeline 200 for UMC 114 (L2 cache controller), if a write request being processed by the selected stage involves an RMW operation. Accordingly, RMW memory sub-pipeline 300 processes a write request if a stage of a corresponding cache memory pipeline determines that an RMW operation is required by the write request. This is generally equivalent to determining whether the write request is a partial write.

Previous stage 316 is an ordinary-processing stage in a cache memory pipeline such as memory pipeline 200. "Ordinary-processing" refers to a pipeline stage that has functions that are performed in processing a memory transaction regardless of whether the memory transaction is a write request that is a partial write and that will be processed using an RMW operation. Previous stage 316 is connected to read from and write to a holding buffer 306. Holding buffer 306 can be, for example, a dedicated set of registers that is part of the memory controller that includes the RMW memory sub-pipeline 300, such as UMC 114.

Pipeline stage 302 is part of the RMW memory sub-pipeline 300, and is also an ordinary-processing stage in the cache memory pipeline. Pipeline stage 302 anchors (connects) RMW memory sub-pipeline 300 to the cache memory pipeline; accordingly, RMW memory sub-pipeline 300 branches off from the cache memory pipeline at pipeline stage 302, and in some systems, returns to (terminates at) the cache memory pipeline at pipeline stage 302. The connection between previous stage 316 and pipeline stage 302 is a dotted arrow to indicate that there may be additional pipeline stages executed between previous stage 316 and pipeline stage 302. Pipeline stage 302 receives a memory read request in a cache memory pipeline (including functions performed regardless of whether an RMW operation is required), such as pipeline stage 208 four (Stage 4 in a pipeline bank 206 in FIG. 2, not shown) in memory pipeline 200. (Pipeline stage 208 four can be, for example, hit and miss control.) Pipeline stage 302 is connected to read from, and write to, cache memory 304 (the cache memory to which the write request's data payload is to be committed). Pipeline stage 302 is also connected to write to the holding buffer 306. The data payload of a write request being processed by RMW memory sub-pipeline 300 is held in the holding buffer 306 during RMW processing.

Pipeline stage 302 is followed by an error detection stage 308. Error detection stage 308 is followed by an error correction stage 310. Error correction stage 310 is followed by a merge stage 312, which is connected to read from holding buffer 306. Merge stage 312 is followed by a syndrome generation stage 314. Syndrome generation stage 314 is followed by a return to pipeline stage 302.

Referring to FIG. 2, a separate RMW memory sub-pipeline 300 can be connected to a pipeline stage 302 in each separate pipeline bank 206 of a memory pipeline 200.

Returning to FIG. 3, when pipeline stage 302 receives a memory write request to process, pipeline stage 302 determines whether an RMW operation is required to make ECCs in a data payload of the write request properly correspond to (and accordingly, properly enable error correction of) respective chunks in the data payload. This determination can be made by, for example, determining whether the memory write request is a partial write, or by checking a flag set by a previous stage 208 in the corresponding pipeline bank 206 that determined whether the memory write request is a partial write. If an RMW operation is required, pipeline stage 302 issues a read request to the address in cache memory 304, and writes (commits) the write request's data payload to a holding buffer 306. If the read request from the pipeline stage 302 results in a cache miss, the data requested by the read request is retrieved from a lower level memory than the cache memory 304 to enable the read request to proceed. For example, if cache memory 304 is an L2 cache 116, then the requested data is retrieved from L3 cache 119 or other lower level memory.

The read request issued by pipeline stage 302 requests retrieval of each chunk in cache memory 304 corresponding to a same memory address as any portion of the write request's data payload. (The resulting data read from cache memory 304 is referred to herein, for convenience, as conforming data.) The conforming data's ECC syndrome is read along with the conforming data. In an example, a write request's data payload is configured to write bytes 0 to 38 in a line of cache memory 304, and chunks are 32 bytes long. Bytes 0 to 38 correspond to a first 32 byte chunk at bytes 0 to 31, and a second 32 byte chunk at bytes 32 to 63. An RMW operation will be indicated, and pipeline stage 302 will issue a read to cache memory 304 for bytes 0 to 63 of the corresponding line of memory, and the two corresponding ECC syndromes. Pipeline stage 302 also writes to holding buffer 306 the write request's data payload, including data, destination memory address, byte enables (indicating which bytes following a destination memory address the data corresponds to, such as, in the example above, bytes 0 to 38), and other control information.

After pipeline stage 302, error detection stage 308 determines whether there are any errors in the conforming data in light of the conforming data's ECC syndrome(s), and determines the type(s) and number(s) of bits of the errors in the conforming data (if any). After the error detection stage 308, the error correction stage 310 corrects the conforming data if necessary (as detected by the error detection stage 308) and possible. For example, in some systems, the conforming data can be corrected using a 10 bit ECC syndrome per 32 byte chunk if the conforming data contains a single one-bit error (or less) in each chunk. If the data cannot be corrected, an appropriate action is taken—for example, the write request may be dropped (discarded), and an exception may be taken.

After data correction stage 310, in merge stage 312, the conforming data is merged with the corresponding data (with exceptions described below, the data payload from the corresponding write request) in holding buffer 306. Accordingly, data from holding buffer 306 replaces (overwrites) corresponding bytes in the conforming data to form a new, merged data. In the example above in which the data payload corresponds to bytes 0 to 38 of a cache memory line, and the conforming data corresponds to bytes 0 to 63 of the cache memory line, the data payload replaces bytes 0 to 38 of the conforming data to form the merged data, also thereby leaving bytes 39 through 63 unchanged.

After merge stage 312, syndrome generation stage 314 uses the merged data to generate one or more new ECC syndromes (as required) corresponding to the merged data. In the example above, the data payload corresponds to bytes 0 to 38 of a cache memory line, and chunks are 32 bytes in length. Bytes 0 to 31 of the merged data do not require an ECC syndrome to be generated using an RMW operation because the corresponding data payload portion was a full chunk prior to merging (an ECC syndrome corresponding to the full chunk—bytes 0 to 31—could have been previously generated). A new ECC syndrome is calculated for bytes 32 to 63 of the merged data because the corresponding data payload portion overwrote only a portion of those bytes, that is, the written data was not a full chunk prior to merging (bytes 32 to 38). The resulting ECC syndrome, which is up-to-date with respect to the write request's data payload, is referred to as being in synchronization with the merged data. In some systems, ECC syndromes for chunks that the processor core 102 produces as full and continuous chunks can be generated at any time prior to the data payload being written to memory, such as prior to the write request being transmitted from DMC 104 (L1 cache controller) to UMC 114 (L2 cache controller).

After syndrome generation stage 314, the write request is returned to pipeline stage 302, and the write request's data payload, along with the new ECC syndrome, is written to cache memory 304. If the read request performed by the pipeline stage 302 resulted in a cache hit, then the data that is written can be only the write request's data payload (and the ECC syndromes corresponding to the chunks included in the data payload), or it can include the merged portion of the conforming data. The conforming data is required to generate a new ECC corresponding to the data payload, but can be optional when writing to the cache memory. The conforming data, having been read from the cache memory, should already be present in the cache memory if the read request performed by the pipeline stage 302 resulted in a cache hit. However, if the read request performed by the pipeline stage 302 resulted in a cache miss, then the data that is written includes the merged portion of the conforming data. An entry in holding buffer 306 corresponding to an RMW operation expires when the RMW operation completes (ends) after the data payload of the write request is written into the corresponding target cache memory. In some systems in which a cache write is completed a clock cycle after the syndrome generation stage is completed, holding buffer entry expiration can occur after generation of the new ECC syndrome by the syndrome generation stage 314.

In some systems, holding buffer 306 can have additional functionality to facilitate pipeline throughput and avoid stalls. The depth of holding buffer 306 is dependent on the total RMW memory pipeline 300 depth. For this purpose, pipeline stage 302 reading from the cache memory 304 is considered the beginning of RMW memory pipeline 300, and syndrome generation stage 314 completing generation of the new ECC syndrome is considered the end of the RMW memory pipeline 300. Holding buffer 306 contains information on all RMW operations that have begun and have not ended (or been terminated by an error, such as at error correction stage 310).

Previous stage 316 checks whether a write request requires an RMW operation. If so, previous stage 316 also checks in holding buffer 306 to find any pending RMW operation to the same address in cache memory 304 as the write request (a same-targeted write request). If there is such a pending RMW operation, then the current holding buffer 306 contents targeting that address, with corresponding byte enables, are combined with the most recent data targeting that address (generally, the contents of the data payload of the write request at previous stage 316). Accordingly, non-overlapping bytes of both the newer data and the older data are retained; if there is any overlap, the most recent data supersedes the specific overlapped bytes of the current holding buffer 306 contents; and the resulting combined data is written into an entry in the holding buffer 306 corresponding to the newer write request. (In some systems, this can be performed by writing the older data into the entry in the holding buffer 306 corresponding to the newer write request, and then performing an RMW operation on the newer write request so that the desired overwriting and resulting combined data is a consequence of the order of operations.) The pending RMW operation on the older data payload continues unaffected (corresponding holding buffer 306 contents are left unchanged), while the newer write request enters the RMW memory pipeline 300 for RMW processing of the combined data. (This is distinct from the case of a full line write—a write request that will write to a full line of the cache memory, and is accordingly not a partial write and does not require an RMW operation—as described below.) If the older write request has not yet finished processing and had its data payload written into the cache memory 304, then the address in the cache memory 304 targeted by the newer write request and the older write request contains data that is stale with respect to the newer write request. Stale data is data scheduled to be updated by a write request preceding the newer write request in a memory pipeline, such as the memory pipeline 200. Accordingly, the data-combining process described with respect to previous stage 316 prevents merge stage 312 from merging the newer write request with stale data. This additional holding buffer 306 functionality can be used, for example, in systems in which a write request can immediately follow another write request within a pipeline bank 206 (referring to FIG. 2), such as systems in which write requests can be issued in each cycle (for example, in systems with intended "write streaming" behavior).

Subject to an intervening read as described below, if previous stage 316 determines that the data payload of a write request corresponds to a full line write, and there is a pending RMW operation targeting the same address, the pending RMW operation is invalidated and the write request at the previous stage 316 proceeds (accordingly, is not stalled). (In some embodiments, this determination could be performed at pipeline stage 302, or a pipeline stage between previous stage 316 and pipeline stage 302.) Also, if a read request is received at a stage of an ordinary-processing cache memory pipeline (such as memory pipeline 200) at an intervening time between previous stage 316 and pipeline stage 302 that originated outside the RMW memory pipeline 300, then pending RMW operations are allowed to complete without allowing write requests at previous stage 316 to overwrite holding buffer 306 contents corresponding to the pending RMW operations.

FIG. 4A shows a table 400 providing an example list of different combinations of chunk contents in a data payload of a write request that targets a write at an address in a cache memory. The body 402 of table 400 is described by a title 404 "bytes in data payload to be written in memory line at target address." Body 402 is divided into four titled columns, corresponding to chunks—in this example, 32 byte ranges 406—of data in a 128 byte maximum data payload of a write request. The four columns have the following titles: [31:0] (byte 0 to byte 31), [63:32] (byte 32 to byte 63), [95:64] (byte 64 to byte 95), and [127:96] (byte 96 to byte 127). The rows of body 402 are indexed in a column 412 with a title 414 "case." Individual cells 416 in body 402 can correspond to a byte range for one of two scenarios, either in a data payload that contains data that will write all bytes (not a partial write) in a corresponding chunk at the target address—accordingly, labeled "all bytes"; or a data payload that contains data that will write less than all bytes in the corresponding chunk, resulting in a partial write—accordingly, labeled "partial."

Figure 4B:
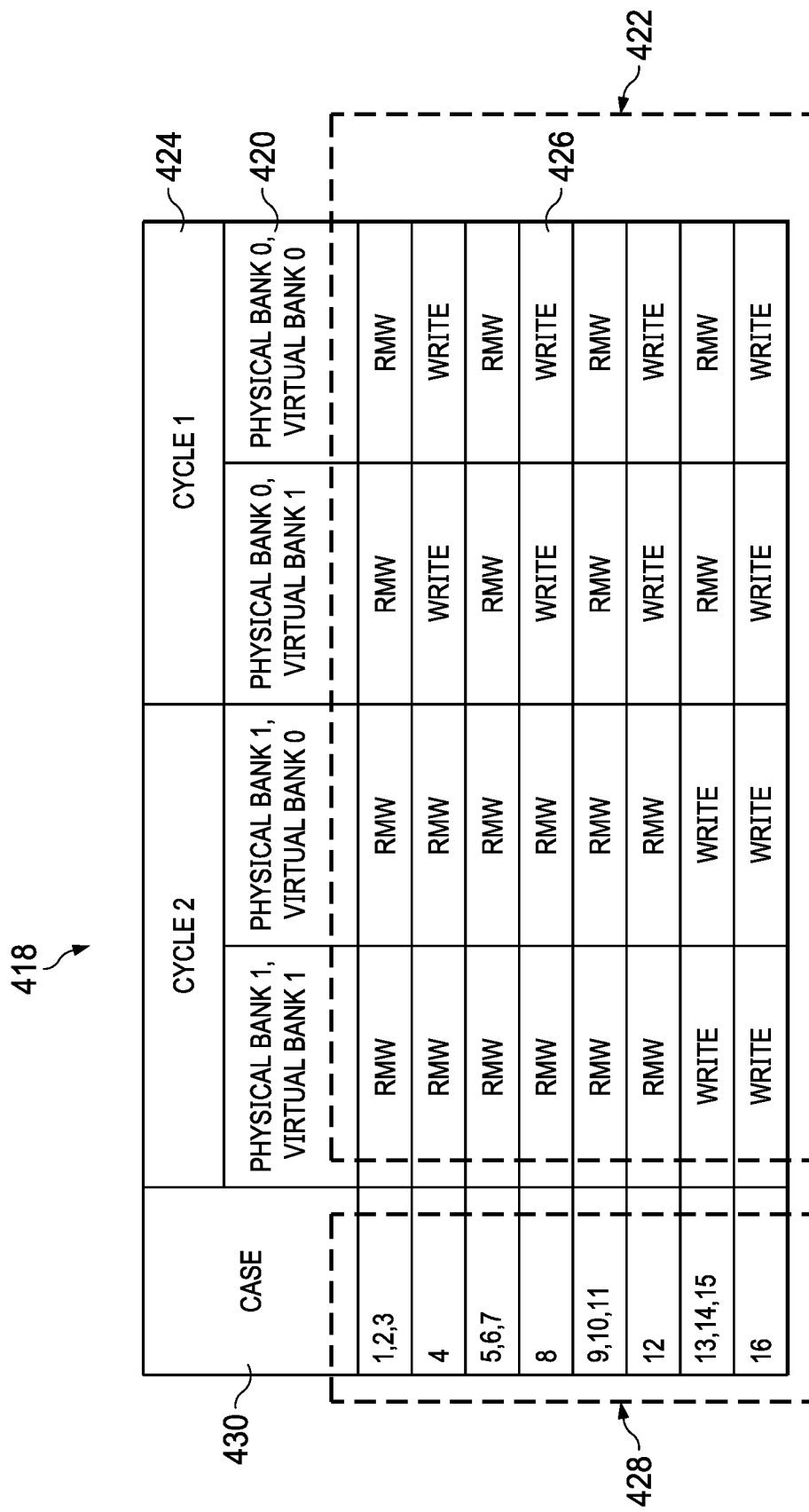
FIG. 4B shows a table providing an example list of operations to use (RMW, full write, etc.) for corresponding cases of FIG. 4A.

FIG. 4B shows a table 418 providing an example list of operations to use (e.g., RMW, full write, etc.) for corresponding cases of FIG. 4A. In a memory system corresponding to FIGS. 4A and 4B, a cache memory is comprised of cache memory lines. In the example, each cache memory line is 128 bytes in length. Each cache memory line has two physical banks (physical bank 0 and physical bank 1), each of length 64 bytes, and each physical bank has two virtual banks (virtual bank 0 and virtual bank 1), each of length 32 bytes. (Byte lengths of the cache line, physical banks, and virtual banks do not include additional related memory—not shown—storing corresponding ECC syndromes and other control information.) Each virtual bank 420, such as virtual bank 0 in physical bank 1, heads a column of a body 422 of table 418 of FIG. 4B. In this example cache memory, each physical bank (64 bytes each) can respectively be written in a single cycle 424 (cycle 1 or cycle 2) of a system clock (such as a clock 103 of a processor 100) by writing both of the physical bank's virtual banks 420 (32 bytes each). (Physical banks 0 and 1 cannot be written at the same time.) This means that 64 bytes in the 128 byte cache line can be written in a clock cycle, and the example cache memory has a 64 byte minimum write length. (In some systems, the example cache memory may also be able to write a full cache line in a single cycle.)

The cells 426 in body 422 are indexed by a column 428 titled 430 "case." Entries in cells 426 are either "RMW," meaning that a corresponding byte range for a corresponding case number (indexed in column 412 in FIG. 4A and column 428 in FIG. 4B) utilizes an RMW operation, or "write," meaning that a corresponding byte range for a corresponding case number can be written to the cache memory without performing an RMW operation.

Physical bank 0, virtual bank 0 corresponds to (is written by) byte range 406 [31:0] of the write request data payload shown in table 400 of FIG. 4A. Physical bank 0, virtual bank 1 corresponds to (is written by) byte range 406 [63:32] of the write request data payload shown in table 400. Physical bank 1, virtual bank 0 corresponds to (is written by) byte range 406 [95:64] of the write request data payload shown in table 400. Physical bank 1, virtual bank 1 corresponds to (is written by) byte range 406 [127:96] of the write request data payload shown in table 400. The example 128 byte cache memory is four 32 byte chunks in length.

Accordingly, bytes in a data payload of a write request in a byte range [63:0] are written together, and bytes in the data payload of the write request in a byte range [127:64] are written together (writes are aligned at physical bank boundaries). This also means that the byte range [63:0] is written separately (and in a different clock cycle) from the byte range [127:64].

As shown in FIGS. 4A and 4B, for 64 byte writes aligned at physical bank boundaries (and that do not overlap with each other), when a chunk (a 32 byte range 406) in a particular case corresponds to a partial write, a write to the corresponding physical bank utilizes an RMW operation (performance of an RMW operation memory pipeline, such as RMW memory pipeline 300 of FIG. 3) on both chunks written to that physical bank. This is because an entire physical bank—64 bytes, corresponding to two chunks—is read or written together. For example, in cases 1, 2, 3, and 4 in table 400 of FIG. 4A, chunks corresponding to byte ranges 406 [127:96] and [95:64] correspond to partial writes (the corresponding entry is "partial), meaning that an RMW operation is required. Accordingly, the entries for virtual banks 0 and 1 of physical bank 1 for cases 1, 2, 3, and 4 in table 418 of FIG. 4B are "RMW." In another example, in cases 5, 6, 7, 8, 9, 10, 11, and 12, only one of the two chunks in byte ranges 406 [127:96] and [95:64] in table 400 corresponds to a partial write. (Byte range 406 [127:96] corresponds to a partial write in cases 5, 6, 7, and 8, and byte range 406 [95:64] corresponds to a partial write in cases 9, 10, 11, and 12.) However, because of the 64 byte minimum write length, as shown in table 418, both virtual banks 0 and 1 of physical bank 1 (respectively corresponding to byte ranges [95:64] and [127:96]) require an RMW operation. In another example, cases 13, 14, 15, and 16 show that "all bytes" in byte ranges 406 [127:96] and [95:64] will be written to the cache memory line by the data payload of the write request. Accordingly, table 418 shows that in cases 13, 14, 15, and 16, virtual banks 0 and 1 of physical bank 1 will be written to the cache memory line without performing an RMW operation (the corresponding table entries are "write").

A minimum write length shorter than a cache memory line length can result in saving multiple clock cycles, and corresponding power expenditure, in completing processing of a write request in some cases. For example, in some systems (such as some systems using an RMW memory pipeline 300 of FIG. 3), completing an RMW operation through committing the corresponding data payload to memory from the RMW/no RMW decision point (for example, pipeline stage 302) may take six cycles, while completing a write operation (without RMW) through committing the corresponding data payload to memory from the RMW/no RMW decision point takes one cycle. Further, an RMW operation requires two memory transactions (a read and a write), while a write operation without RMW requires one memory transaction (a write). Also, there can be hazards that prevent full pipelining while an RMW operation is in progress. Savings realized by a minimum write length that is a shorter (such as an integer factor N shorter) than a memory cache line length are illustrated by cases 4, 8, 12, 13, 14, and 15 of FIG. 4B, in which RMW operation is not required for chunks written to one of the physical banks, despite an RMW operation being required for chunks written to the other physical bank.

FIG. 4C shows a table 432 providing an alternative example list of whether an RMW is utilized for corresponding cases of FIG. 4A. Similar content types in portions of table 432 of FIG. 4C to content types of corresponding portions of table 418 of FIG. 4B have the same identifying numbers. An example cache memory corresponding to FIG. 4C is similar to the example cache memory of FIGS. 4A and 4B, except that the example cache memory corresponding to FIG. 4C has a minimum cache memory write length of 32 bytes, the same length as the chunk length (and the virtual bank length). Writes according to table 432 do not overlap with each other (are non-overlapping) and are aligned with cache line boundaries. Accordingly, in table 432, only chunks corresponding to partial writes require RMW operations. For example and returning to table 400 of FIG. 4A, in case 6, a chunk to be written to physical bank 1, virtual bank 1 (byte range 406 [127:96]) is a partial write; a chunk to be written to physical bank 1, virtual bank 0 (byte range 406 [95:64]) is not a partial write ("all bytes"); a chunk to be written to physical bank 0, virtual bank 1 (byte range 406 [63:32]) is a partial write; and a chunk to be written to physical bank 0, virtual bank 0 (byte range 406 [31:0]) is not a partial write. For the case 6 example as applied to the 64 byte (double the chunk length) minimum write length of FIG. 4B, then in its table 418 (case 6), the case 6 example of partial write chunks and non-partial write chunks results in all chunks of the data payload requiring RMW operations. However, in the example of table 432 of FIG. 4C (case 6), with 32 byte minimum write length (equal to the chunk length), only the partial write chunks—the chunks to be written to physical bank 1, virtual bank 1 and physical bank 0, virtual bank 1—require RMW operations.

Consider a cache memory with cache memory lines of length L bytes, a minimum write length M bytes (aligned with memory bank boundaries) such that $L/M \geq 1$ is an integer (the number of writes to fully write a cache memory line), and a chunk length of P bytes such that there is an integer number $L/P \geq 1$ chunks in a cache memory line. Generally, under these conditions, a chunk in a data payload corresponding to a partial write will require an RMW operation to be performed on an integer $M/P \geq 1$ chunks in the data payload. If $L/M \geq 2$, then a chunk in a data payload corresponding to a partial write may not require all chunks in the data payload written to the cache memory line to receive RMW operations. If M equals P, then chunks in the data payload that do not correspond to partial writes may not require RMW operations. (In some systems, only chunks in the data payload that correspond to partial writes will require RMW operations.)

Except where otherwise explicitly indicated (such as the number of bits in an ECC syndrome), memory lengths provided herein refer specifically to data, and not to control of data.

Modifications are possible in the described embodiments, and other embodiments are possible, within the scope of the claims.

In some embodiments, the streaming engine only receives and passes on read requests from the processor core, and returns read data to the processor core, rather than passing on and returning responses for both read and write requests.

In some embodiments, the processor can include multiple processor cores (embodiments with multiple processor cores are not shown), with similar and similarly-functioning couplings to DMC, the streaming engine, and PMC to those shown in and described with respect to FIG. 1. In some embodiments, processor includes different functional blocks.

In some embodiments, bus lines enabling parallel read or write requests can correspond to different types of read or write requests, such as directed at different blocks of memory or made for different purposes.

In some embodiments, the streaming engine enables the processor core to communicate directly with higher level cache (such as L2 cache), skipping lower level cache (such as L1 cache), to avoid data synchronization issues. This can be used to help maintain memory coherence. In some such embodiments, the streaming engine can be configured to transmit only read requests, rather than both read and write requests.

In some embodiments, different memory access pipeline banks can have different numbers of stages.

In some embodiments, syndrome generation stage 314 is followed by a return to a stage in the cache memory pipeline prior to pipeline stage 302, after arbitration and scheduling and cache hit detection.

In some embodiments, pipeline stage 302 can perform the functions of previous stage 316. In some embodiments, RMW memory sub-pipeline 300 can be anchored to the cache memory pipeline by a stage performing the functions of previous stage 316. In some embodiments, previous stage 316 can be considered part of RMW memory sub-pipeline 300.

What is claimed is:

1. An integrated circuit comprising:
    a cache memory;
    a buffer; and
    a pipeline that includes:
        a first stage coupled to the buffer;
        a second stage coupled to the buffer and coupled between the first stage and the cache memory; and
        a merge stage coupled to the second stage;
    wherein the second stage is configured to:
        receive a first instruction having a first set of data from the first stage;
        determine whether the first instruction corresponds to a partial write;
        based on the first instruction corresponding to a partial write:
            store the first set of data in the buffer; and
            retrieve, from the cache memory, a second set of data;
    wherein the first stage is configured to:
        receive a second instruction having a third set of data;
        determine whether the first instruction and the second instruction are associated with a same address; and
        based on the first instruction and the second instruction being associated with the same address:
            merge the first set of data and the third set of data to produce a first set of merged data; and
            store the first set of merged data in the buffer; and
    wherein the merge stage is configured to merge the first set of merged data and the second set of data to produce a second set of merged data.

2. The integrated circuit of claim 1, wherein the first stage is configured to merge the first set of data and the third set of data by overwriting a portion of the first set of data with a portion of the third set of data.

3. The integrated circuit of claim 1, wherein the first stage is further configured to:
    determine whether the second instruction is associated with a full line write; and
    based on the second instruction being associated with a full line write, cause the second stage to invalidate the first instruction.

4. The integrated circuit of claim 1, wherein the second stage is further configured to:
    receive the second instruction from the first stage;
    determine whether the second instruction is associated with a full line write; and
    based on the second instruction being associated with a full line write, invalidate the first instruction.

5. The integrated circuit of claim 1, wherein the second stage is further configured to store the second set of merged data in the cache memory.

6. The integrated circuit of claim 1 further comprising a syndrome generation stage coupled to the merge stage and configured to generate an error correction code syndrome based on the second set of merged data, wherein the second stage is configured to store the error correction code syndrome in the cache memory.

7. The integrated circuit of claim 6, wherein the second stage is configured to provide the first set of merged data to the cache memory without providing an entirety of the second set of merged data.

8. The integrated circuit of claim 1, wherein:
    the second stage is further configured to retrieve an error correction code syndrome associated with the second set of data from the cache memory; and
    the integrated circuit further comprises an error detection stage coupled to the second stage and configured to determine whether an error is present in the second set of data based on the error correction code syndrome.

9. The integrated circuit of claim 8 further comprising a data correction stage coupled to the error detection stage and configured to, when the error is present in the second set of data, correct the error.

10. A method comprising:
    receiving a first write request associated with a first set of data;
    determining that the first write request is a partial write;
    based on the first write request being a partial write:
        storing the first set of data in a buffer; and
        requesting a second set of data associated with the first write request;
    receiving a second write request associated with a third set of data;
    determining that the first write request and the second write request are associated with a same address;
    based on the first write request and the second write request being associated with the same address, merging the first set of data and the third set of data to produce a first set of merged data;
    merging the first set of merged data and the second set of data to produce a second set of merged data; and
    storing the second set of merged data.

11. The method of claim 10, wherein the merging of the first set of data and the third set of data includes overwriting a portion of the first set of data with a portion of the third set of data.

12. The method of claim 10 further comprising:
    determining that the second write request is associated with a full line write; and
    based on the second write request being associated with a full line write, invalidating the first write request.

13. The method of claim 10 further comprising:
    generating an error correction code syndrome based on the second set of merged data; and
    storing the error correction code syndrome with the second set of merged data.

14. The method of claim 10, wherein the storing of the second set of merged data includes providing the first set of merged data to a cache without providing an entirety of the second set of merged data.

15. The method of claim 10 further comprising:
    requesting an error correction code syndrome associated with the second set of data; and
    determining whether an error is present in the second set of data based on the error correction code syndrome.

16. The method of claim 15 further comprising correcting the error in the second set of data.

17. An integrated circuit comprising:
a cache memory;
a buffer; and
a pipeline that includes:
  a pipeline stage coupled to the buffer and the cache memory;
  a merge stage coupled to the pipeline stage; and
  a syndrome generation stage coupled to the merge stage;
wherein the pipeline stage is configured to:
  receive a write instruction having a first set of data;
  determine whether the write instruction corresponds to a partial write;
  based on the write instruction corresponding to a partial write:
    store the first set of data in the buffer; and
    retrieve, from the cache memory, a second set of data;
wherein the merge stage is configured to merge the first set of data and the second set of data to produce a merged set of data;
wherein the syndrome generation stage is configured to generate an error correction code syndrome based on the merged set of data; and
wherein the pipeline stage is configured to store the merged set of data and the error correction code syndrome in the cache memory by providing the first set of data without providing an entirety of the merged set of data.

\* \* \* \* \*